United States Patent [19]

Haluska

[11] 4,173,553

[45] Nov. 6, 1979

[54] NON-COLORING, ABRASION RESISTANT, ADHERENT COATING FOR GOLD AND SILVER SURFACES

[75] Inventor: Loren A. Haluska, Midland, Mich.

[73] Assignee: Dow Corning Corporation, Midland, Mich.

[21] Appl. No.: 863,969

[22] Filed: Dec. 23, 1977

[51] Int. Cl.$^2$ ............................ C08J 3/02; C08L 83/04
[52] U.S. Cl. ........................ 260/29.2 M; 260/29.1 SB; 260/29.2 EP; 260/29.2 UA; 260/33.2 R; 260/33.4 SB; 260/33.4 EP; 260/448.2 N; 428/412; 428/450; 528/30; 528/42

[58] Field of Search ................... 260/29.2 M, 29.2 EP, 260/29.2 UA, 33.2 R, 33.4 SB, 33.4 EP, 29.1 SB; 528/30, 42

[56] References Cited

U.S. PATENT DOCUMENTS 3,986,997  10/1976  Clark .............................. 260/29.2 M Primary Examiner—J. Ziegler
Attorney, Agent, or Firm—Robert L. McKellar

[57] ABSTRACT

A sulfur containing abrasion resistant coating with excellent adhesion to gold and silver surfaces, without concomitant discoloration of the metal, is disclosed. Such coatings are useful for protecting gold and silver surfaces from damage due to weathering and/or mishandling.

14 Claims, No Drawings

4,173,553

NON-COLORING, ABRASION RESISTANT, ADHERENT COATING FOR GOLD AND SILVER SURFACES

BACKGROUND OF THE INVENTION

This invention relates to non-coloring, abrasion resistant coatings which adhere to and protect gold and silver surfaces without discoloration of the metal.

For a long time there has been a need to protect the surfaces of various metals from the influence of the weather and from abuse during the handling of such materials. Ordinarily, most common metals such as aluminum, steel, iron and their various alloys have been protected from corrosion by coating those substrates with greases (in the case of iron and its alloys) or by coating the surfaces with paints, clear lacquers and varnishes or by anodizing or electroplating and deposition.

Even though the above methods protect the metal substrates from corrosion to a certain degree, the form of protection, that is, the method utilized to coat the substrate cannot be uniformly used on all metal substrates. The coating of the various metal substrates usually involves the selection of the particular method of coating to also give other desirable properties such as aesthetic appearance, abrasion resistance, transparency, lubricity and the like.

One of the most common forms of corrosion protection is the coating of the metal substrates with organic or silicone coatings or various combinations of multilayers of organic and silicone coatings or copolymers thereof.

Inherent in these coatings is the problem of adhesion and this problem has been attacked many ways. For example, primers which couple the coatings to the substrates are numerous. Patent publications and other published literature abound with primer technology. These publications illustrate very well that the primers are not universal and must be matched according to the coating and the substrate utilized.

Adhesion additives have also been widely recommended and have been published on extensively. These adhesion additives function by co-reacting in-situ with the coating and then eventually co-reacting with the substrate when the coating is laid on the substrate to give the bonding effect.

Other forms of adhesion promoters have depended upon a physical attachment of various polymers to substrates and the subsequent surmounting of such polymers by the protective coatings.

All of the above methods, however, have not been sufficient to solve the problems associated with adhering coatings to the more uncommon metals such as nickel, copper, gold and silver. Special measures are usually necessary to adhere coatings to these substrates for prolonged periods of time and usually, there must be a sacrifice of some desirable properties of these uncommon metals in order to get prolonged adhesion of the coatings to them, especially the gold and silver metals.

THE INVENTION

It has now been found that a new composition of matter will give abrasion resistant coating with excellent adhesion, without concomitant discoloration.

This invention deals with a new composition of matter which will give clear abrasion resistant coatings having good and prolonged adhesion to gold and silver substrates without discoloration of the substrates.

Such a composition finds utility as an abrasion resistant overcoat on silvered surfaces which serve as solar reflectors in solar energy devices.

Such overcoats must have clarity such that the rays of the sun pass through to the silvered surface. Such overcoats must be abrasion resistant and able to withstand handling abuse. Such overcoats must protect the silvered surface from corrosion and must further withstand the ravages of extended exposure to the weather. Further, such coatings must adhere tenaciously to the metal substrates in order to afford the protection discussed above. Such coatings, of course, must not discolor or reduce the reflectivity of the metal surface.

A composition which gives all of the above desirable properties is a pigment free aqueous coating composition comprising a dispersion of colloidal silica in lower aliphatic alcohol-water solution or a dispersion of colloidal silica in lower molecular weight ether alcohol-water solution of a partial condensate of a mixture of silanols of the formula $RSi(OH)_3$ in which R is selected from the group consisting of alkyl radicals of 1–3 inclusive carbon atoms and R′ wherein R′ is selected from $R''(S)_nR'''$— and $(HS)_aR'''$— wherein R″ is a substituted or unsubstituted monovalent hydrocarbon radical of 1 to 6 carbon atoms wherein the hydrocarbon atom is substituted by radicals selected from the group consisting of —COOH, —COH, $$-\underset{OH}{CH}-\underset{OH}{CHCH_2}-,$$

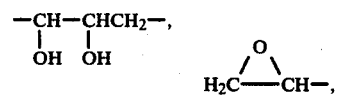

HS—, —NH$_2$, NH(R″″)$_x$, Cl, Br and vinyl, n has a value of 1–4 and a has a value of 1 or 2, R‴ is a divalent hydrocarbon radical containing 1–6 carbon atoms, R″″ is an alkyl radical of 1–4 carbon atoms, x is 1 or 2, at least 50 weight percent of the silanol being $CH_3Si(OH)_3$ and at least 0.4 weight percent of the silanol being $R'Si(OH)_3$, said composition containing 10 to 50 weight percent solids consisting essentially of 10 to 70 weight percent colloidal silica and 30 to 90 weight percent of the partial condensate, said composition containing sufficient acid to provide a pH in the range of 2.8 to 5.5.

As set forth above, the non-volatile solids portion of the coating composition is a mixture of colloidal silica and the partial condensate of silanols.

The major portion of the partial condensate is $CH_3Si(OH)_3$ but minor portions of other silanols i.e. $CH_3CH_2Si(OH)_3$ and $CH_3CH_2CH_2Si(OH)_3$ can be co-condensed with the $CH_3Si(OH)_3$. The other major portion of the partial condensate is $R'Si(OH)_3$ wherein R′ has been described above. It is essential to note that the radical R′ must always contain at least one sulfur atom.

It is when the $CH_3Si(OH)_3$ and the $R'Si(OH)_3$ are mixed with the colloidal silica that the compositions take on their uniqueness.

It should be noted that in the partial condensate of this composition, there must be at least 50 weight percent of $CH_3Si(OH)_3$ based on the weight of the total ingredients in the partial condensate.

It should also be noted that in the partial condensate of this composition, there must be at least 0.4 weight percent of $R'Si(OH)_3$ based on the weight of the total ingredients in the partial condensate. It follows therefore that the partial condensate of this composition can have as high as 96.6 weight percent $CH_3Si(OH)_3$ and as low as 50 weight percent $CH_3Si(OH)_3$ while there can be as low as 0.4 weight percent of $R'Si(OH)_3$.

It has been determined that as high as 50 weight percent of the partial condensate can be $R'Si(OH)_3$ but the same effects can be had with much less than 50 weight percent. Preferably, between 0.4 and 10 weight percent of the partial condensate is $R'Si(OH)_3$ and the remainder is $CH_3Si(OH)_3$. Most preferably, 0.5 to 5 weight percent of the $R'Si(OH)_3$ is used in the partial hydrolyzate with the remainder being $CH_3Si(OH)_3$.

As will become evident from the examples herein, the partial condensates are generated in-situ by mixing the corresponding trialkoxy silanes together and adding them to acidic aqueous dispersions of colloidal silica. The alkoxysilane starting materials can have alkoxy groups containing 1–4 carbon atoms and are those alkoxysilanes which can be readily hydrolyzed to liberate the corresponding alcohol which in this invention forms part of the coating composition.

As the alkoxy groups are removed by hydrolysis to form the alcohols, the silane forms into a silanol which readily condenses to form —Si—O—Si bonds. As noted in U.S. Pat. No. 3,986,997, issued Oct. 19, 1976 to Harold A. Clark and assigned to the assignee herein, the condensation is not complete in that all the silanols that are formed do not condense to Si—O—Si bonds but rather the siloxane retains an appreciable quantity of silicon bound hydroxyl groups which help to solubilize the polymer in the solvent.

The silica component of the composition is present as colloidal silica. Aqueous colloidal silica dispersions generally have a particle size in the range of 5 to 50 millimicrons in diameter. These silica dispersions are prepared by methods well-known in the art and are commercially available under such registered trademarks as "Ludox" and "Nalcoag". It is preferred to use colloidal silica of 10–30 millimicron particle size in order to obtan dispersions having a greater stability and to provide coating having superior optical properties. Colloidal silicas of this type are relatively free of $Na_2O$ amd other alkali metal oxides, generally containing less than 2 weight percent, preferably less than 1 weight percent $Na_2O$. They are available as both acidic and basic hydrosols. Colloidal silica is distinguished from other water dispersable forms of $SiO_2$, such as nonparticulate polysilicic acid or alkali metal silicate solutions, which are not operative in the practice of the present invention.

The silica is dispersed in a solution of the siloxanol carried in a lower aliphatic alcohol-water cosolvent or lower molecular weight ether alcohol-water cosolvent. Suitable lower aliphatic alcohols include methanol, ethanol, isopropanol, butanol and t-butyl alcohol. Mixtures of such alcohols can be used. Isopropanol is the peferred alcohol and when mixtures of alcohol are utilized it is preferred to utilize at least 50 weight percent of isopropanol in the mixture to obtain optimum adhesion of the coating. The lower molecular weight ether alcohols useful in this invention include $QO(CH_2CH_2O)_xH$ wherein Q is methyl, ethyl, propyl and butyl and x is 1 or 2. Preferred is the methyl cellosolve i.e. $CH_3OCH_2CH_2OH$. The solvent system should contain from about 20 to 75 weight percent alcohol or ether alcohol to ensure solubility of the siloxanol. Optionally one can utilize an additional water-miscible polar solvent, such as acetone, and the like in a minor amount, for example, no more than 20 weight percent of the cosolvent system.

To obtain optimum properties in the coating and to prevent immediate gellation of the coating composition, sufficient acid to provide a pH of from 2.8 to 5.5 must be present. Suitable acids include both organic and inorganic acids such as hydrochloric, acetic, chloroacetic citric, benzoic, dimethylmalonic, formic, glutaric, glycolic, maleic, malonic, toluene-sulfonic, oxalic and the like. The specific acid utilized has a direct effect on the rate of silanol condensation which in turn determines shelf life of the composition. The stronger acids, such as hydrochloric and toluenesulfonic acid, give appreciably shortened shelf or bath life and require less aging to obtain the described soluble partial condensate. It is preferred to add sufficient water-miscible carboxylic acid selected from the group consisting of acetic, formic, propionic and maleic acids to provide pH in the range of 4 to 4.5 in the coating composition. In addition to providing good bath life, the alkali metal salts of these acids are soluble, thus allowing the use of these acids with silicas containing a substantial (greater than 0.2% $Na_2O$) amount of alkali metal or metal oxide.

The coating compositions are easily prepared by adding trialkoxysilane, such as $RSi(OCH_3)_3$, to colloidal silica hydrosols and adjusting the pH to the desired level by addition of the organic acid. The acid can be added to either the silane or the hydrosol prior to mixing the two components provided that the mixing is done rapidly. The amount of acid necessary to obtain the desired pH will depend on the alkali metal content of the silica but is usually less than one weight percent of the composition. Alcohol is generated by hydrolysis of the alkoxy substituents of the silane, for example, hydrolysis of one mole of —$Si(OC_2H_5)_3$ generates 3 moles of ethanol. Depending upon the percent solids desired in the final composition, additional alcohol, water or a water-miscible solvent can be added. The composition should be well mixed and allowed to age for a short period of time to ensure formation of the partial condensate. The coating composition thus obtained is a clear or slightly hazy low viscosity fluid which is stable for several weeks. The condensation of $\equiv$SiOH continues at a very slow rate and the composition will eventually form gel structures. The bath life of the composition can be extended by maintaining the dispersion at below room temperature, for example at 40° F.

Buffered latent condensation catalysts can be added to the composition so that milder curing conditions can be utilized to obtain the optimum abrasion resistance in the final coating. Alkali metal salts of carboxylic acids, such as potassium formate, are one class of such latent catalysts. The amine carboxylates and quaternary ammonium carboxylates are another such class of latent catalysts. Of course the catalysts must be soluble or at least miscible in the cosolvent system. The catalysts are latent to the extent that at room temperature they do not appreciably shorten the bath life of the composition, but upon heating the catalysts dissociates and generates a catalytic species active to promote condensation. Buffered catalysts are used to avoid effects on the pH of the composition. Certain of the commercially available colloidal silica dispersions contain free alkali metal base which reacts with the organic acid during the adjustment of pH to generate the carboxylate catalysts in situ. This is particularly true when starting with a hydrosol having a pH of 8 or 9. The compositions can be catalyzed by addition of carboxylates such as dimethylamine acetate, ethanolamine acetate, dimethylaniline formate, tetraethylammonium benzoate, sodium acetate, sodium propionate, sodium formate or beta-hydroxyethyltrimethylammonium acetate. The amount of catalyst can be varied depending upon the desired curing condition, but at about 1.5 weight percent catalyst in the composition, the bath life is shortened and some properties of the coating may be impaired. It is preferred to utilize from about 0.05 to 1 weight percent of the catalyst.

To provide the greatest stability in the dispersion form while obtaining optimum properties in the cured coating, it is preferred to utilize a coating composition having a pH in the range of 4-5 which contains 10-25 weight percent solids; the silica portion having a particle size in the range of 5-30 millimicrons; the partial condensate of $CH_3Si(OH)_3$ and $R'Si(OH)_3$ being present in an amount in the range of 35 to 55 weight percent of the total solids in a cosolvent of methanol, isopropanol and water, the alcohols representing from 30 to 60 weight percent of the cosolvent and a catalyst selected from the group consisting of sodium acetate and beta-hydroxyethyltrimethylammonium acetate being present in an amount in the range of 0.05 to 0.5 weight percent of the composition. Such a composition is relatively stable, having a bath life of several months and, when coated onto a substrate, can be cured in a relatively short time at temperatures in the range of 75°–125° C. to provide a transparent abrasion resistant surface coating giving no discoloration of the substrate.

The coating compositions of the invention can be applied to solid substrates by conventional methods, such as flowing, spraying or dipping to form a continuous surface film.

By choice of proper formulation, including solvent, application conditions and pretreatment of the substrate, the coatings can be adhered to substantially all solid surfaces. A hard solvent-resistant surface coating is obtained by removal of the solvent and volatile materials. The composition will air dry to a tack-free condition, but heating in the range of 50° to 150° C. is necessary to obtain condensation of residual silanols in the partial condensate. This final cure results in the formation of mixed silsesquioxanes of the formula $RSiO_{3/2}$ and $R'SiO_{3/2}$ and greatly enhances the abrasion resistance of the coating. The coating thickness can be varied by means of the particular application technique, but coatings of about 0.5 to 20 micron preferably 2-10 micron thickness are generally utilized.

As indicated above, R in the partial condensate is selected from alkyl radicals of 1-3 carbon atoms or R' wherein R' represents the formulas $R''(S)_nR'''$— and $(HS)_aR'''$—.

R" for purposes of this invention is a substituted or unsubstituted monovalent hydrocarbon radical of 1 to 6 carbon atoms. Thus R" can be methyl, ethyl, propyl and up to hexyl or R" can be a phenyl group.

When R" is substituted, it is intended that the substituents be functional groups, that is, the R" radical can be substituted by the carboxyl, carbinol, epoxy, mercapto, amino, substituted amino i.e. $NH(R'''')_x$, wherein R'''' is an alkyl radical of 1-4 carbon atoms and x is 1 or 2, the halogens chlorine and bromine and the vinyl radical.

Specific examples of such substituted radicals would be $HOOCCH_2CH_2CH_2$—, $ClCH_2CH_2CH_2$—, $H_2NCH_2CH_2$—,

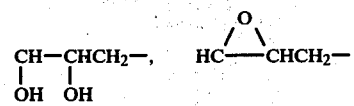

and $HOCH_2CH_2$—.

R''' is a divalent hydrocarbon radical containing 1-6 carbon atoms. This R''' radical is the chemical bridge between the sulfur atom of the molecule and the silicon atom and can be represented by —$CH_2CH_2$—, —$CH_2$—$CH_2$—$CH_2$— and

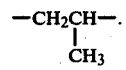

In the above formulas, n has a value of 1-4, that is, the radical has a sulfide linkage and up to four sulfur atoms linked together can be utilized.

In the above formula, a has a value of 1 or 2. Generally, such radicals have only a single mercaptan group but radicals having configurations such as

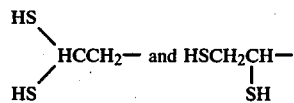

are within the scope of this invention.

It is believed that this invention operates by electrostatic bonding of the sulfur atoms of the $R'Si(OH)_3$ to the metals although the inventor does not wish to be held to such a theory.

Now, in order that those skilled in the art more fully understand and appreciate the invention, the following examples are offered. IPA, Me and Br when used herein designate isopropanol, methyl and butyl respectively.

EXAMPLE 1

A coating composition containing 50 weight percent solids which contained as solids 50 weight percent colloidal $SiO_2$, and 50 weight percent of partial hydrolyzate, was formulated from an acidic colloidal dispersion of 16-22 millimicron silica (pH of 4.2). A mixture of alkoxysilanes containing 50 weight percent $CH_3Si(OMe)_3$, 50 weight percent of $HSCH_2CH_2CH_2Si(OMe)_3$ and enough methyl cellosolve to make a 50% solids solution was prepared. The two were mixed together. To this first mixture was added 2.6 grams of acetic acid in 31 grams of $H_2O$. The mixture was stirred for 1 hour. Thereafter, 9.89 grams of the resin (33% solids) was treated with 0.11 grams of a 10% solution of

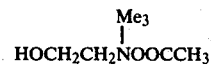

in IPA.

The resin which contained 50 weight percent colloidal $SiO_2$; 25 weight percent $CH_3SiO_{3/2}$ and 25 weight percent $HSCH_2CH_2CH_2SiO_{3/2}$ was flow coated on a 1"×2½"×0.018" (1.9 cm×6.25 cm×0.045 cm) piece of silver foil that had been previously cleaned with a dust-free cloth and filtered isopropanol and allowed to dry. The coated silver piece was air dried for 1 hour, then heat cured at 125° C. for 2 hours. After cooling to room temperature, a crosshatch adhesion test was run. The crosshatch adhesion test consists of pulling #600 adhesive tape (manufactured by 3M Company) from a ⅛ inch crosshatched grid of the coating. The grid is formed by crosshatching the coating with a razor blade or some such other sharp object. The tape is then applied to the grid with the adhesive side towards the coating and pressed firmly down. The tape is then removed in an attempt to dislodge any ⅛ inch (0.32 cm) crosshatch squares that have not firmly adhered.

Using the above test, the adhesion for the above formulation, without primers or adhesion additives, was 100%.

A pencil eraser abrasion test which is performed by rubbing a pencil eraser across the surface of the coating, with moderate pressure, in several back and forth motions, showed that this coating had good abrasion resistance since 25 rubs produced only a very slight marring.

In contrast, however, a resin prepared according to U.S. Pat. No. 3,986,997, Example 2, when flow coated into a silver foil and cured at 125° C. for 2 hours under the same conditions as above, was not adherent and flaked-off the silver surface before the adhesion test could be performed.

EXAMPLE 2

A coating composition was prepared essentially as in Example 1 above except that a lesser amount of $HSCH_2CH_2CH_2Si(OMe)_3$ was used to give a partial condensate having 4.0 weight percent $HSCH_2CH_2CH_2Si(OH)_3$ and 96.0 weight percent $CH_3Si(OH)_3$; the colloidal silica was basic having a particle size of 13–14 millimicrons and a pH of 9.8 and an $Na_2O$ content of 0.32%. The alkoxy-silanes were mixed and added to the colloidal silica. Enough glacial acetic acid was added to acidify the mixture. It was mixed and the pH adjusted to 4.0 with additional acid after 4 hours stirring. It was diluted to 24% solids with isopropanol.

This composition was flow coated onto three separate silver foils as was done in the example above and cured by the following schedule:

| | |
|---|---|
| Sample 1 | 15 hrs. @ 80° C. |
| Sample 2 | 15 hrs. @ 125° C. |
| Sample 3 | 15 hrs. @ 125° C. |

All three samples had 100% adhesion with good abrasion resistance. The pieces cured at 125° C. had a slight discoloration and Sample 1 had no discoloration.

EXAMPLE 3

A gold plated steel plate measuring 4"×6"×⅛" (10.16 cm×15.24×0.32 cm) was cleaned as in Example 1 above. The composition of Example 2 was coated on the gold surface at 78° F. and 26% relative humidity. It was then air dried for 35 minutes. It was then cured 14½ hours at 125° C. and then allowed to equilibrate for 2 days at room temperature. The adhesion in the crosshatch test was 100%. The abrasion was good as determined by rubbing the surface with #0000 steel wool and medium pressure and there was no discoloration.

That which is claimed is:

1. A pigment free aqueous coating composition comprising a dispersion of colloidal silica in a lower aliphatic alcohol-water solution, or a dispersion of colloidal silica in an ether alcohol-water solution, of a partial condensate of a mixture of silanols of the formula $RSi(OH)_3$ in which R is selected from the group consisting of alkyl radicals of 1–3 inclusive carbon atoms and R' wherein R' is selected from $R''(S)_nR'''$— and $(HS)_aR'$—'' — wherein R'' is a substituted or unsubstituted monovalent hydrocarbon radical of 1 to 6 carbon atoms wherein the hydrocarbon atom is substituted by radicals selected from the group consisting of —COOH, —COH,

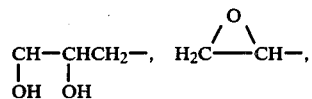

HS—, —$NH_2$, $NH(R'''')_x$, Cl, Br and vinyl,
n has a value of 1–4 and a has a value of 1 or 2,
R''' is a divalent hydrocarbon radical containing 1–6 carbon atoms,
R'''' is an alkyl radical of 1–4 carbon atoms,
x is 1 or 2,
at least 50 weight percent of the silanol being $CHSi(OH)_3$ and at least 0.4 weight percent of the silanol being $R'Si(OH)_3$, said composition containing 10 to 50 weight percent solids consisting essentially of 10 to 70 weight percent colloidal silica and 30 to 90 weight percent of the partial condensate, said composition containing sufficient acid to provide a pH in the range of 2.8 to 5.5.

2. A coating composition in accordance with claim 1 in which the alcohol in the alcohol-water cosolvent is present in an amount in the range of 20 to 75 weight percent based on the total weight of the cosolvent.

3. A composition in accordance with claim 2 wherein at least 50 weight percent of the alcohol is isopropanol.

4. A composition in accordance with claim 2 wherein the alcohol-water cosolvent contains a water-miscible polar solvent in an amount up to 20 weight percent based on the weight of suspending medium.

5. A composition in accordance with claim 4 wherein the polar solvent is acetone.

6. A composition in accordance with claim 2 wherein the acid is water-miscible organic acid selected from the group consisting of acetic acid, formic acid, propanoic acid and maleic acid.

7. A composition in accordance with claim 6 containing from about 0.05 to 1.5 weight percent of a buffered latent silanol condensation catalyst.

8. A composition in accordance with claim 7 containing a sodium catalyst as the sodium salt of the water-miscible organic acid.

9. A composition in accordance with claim 7 containing as the catalyst a carboxylic acid salt of an amine.

10. A composition in accordance with claim 7 containing as the catalyst a quaternary ammonium salt.

11. A composition in accordance with claim 10 wherein the salt is beta-hydroxyethyltrimethylammonium acetate.

12. A composition in accordance with claim 6 wherein the partial condensate is formed from 50 weight percent $CH_3Si(OH)_3$ and 50 weight percent $HSCH_2CH_2CH_2Si(OH)_3$ based on the total weight of the $CH_3Si(OH)_3$ and $HSCH_2CH_2CH_2Si(OH)_3$.

13. A composition in accordance with claim 6 wherein the partial condensate is formed from 96.6 weight percent $CH_3Si(OH)_3$ and 0.4 weight percent $CH_3SSCH_2CH_2CH_2Si(OH)_3$ based on the total weight of the $CH_3Si(OH)_3$ and $CH_3SSCH_2CH_2CH_2Si(OH)_3$.

14. A composition in accordance with claim 6 wherein the partial condensate is formed from 90 weight percent $CH_3Si(OH)_3$ and 10 weight percent $HOOCCH_2CH_2SCH_2CH_2Si(OH)_3$ based on the total weight of the $CH_3Si(OH)_3$ and $HOOCCH_2CH_2SCH_2CH_2Si(OH)_3$.

* * * * *

UNITED STATES PATENT AND TRADEMARK OFFICE
CERTIFICATE OF CORRECTION

PATENT NO. : 4,173,553
DATED : November 6, 1979
INVENTOR(S) : Loren A. Haluska

It is certified that error appears in the above-identified patent and that said Letters Patent are hereby corrected as shown below:

In Column 3, line 34; the number "50" should read "150".

In Column 3, line 40; the word "obtan" should read "obtain".

In Column 3, line 41; the word "coating" should read "coatings".

In Column 3, line 43; the word "amd" should read "and".

In Column 3, line 57; the word "peferred" should read "preferred".

In Column 6, line 64; the line "X2 1/2"X0.018" (1.9 cmX6.25 cmX 0.045 cm) piece of    should read    -- 3/4"x 2 1/2" x0.018" (1.9 cm x 6.25 cm x .045 cm) piece of "

UNITED STATES PATENT AND TRADEMARK OFFICE
CERTIFICATE OF CORRECTION

PATENT NO. : 4,173,553

DATED : November 6, 1979

INVENTOR(S) : Loren A. Haluska

It is certified that error appears in the above-identified patent and that said Letters Patent are hereby corrected as shown below:

In Column 7, line 21; the word "into" should read -- unto --.

Signed and Sealed this

Fifteenth Day of September 1981

[SEAL]

Attest:

GERALD J. MOSSINGHOFF

*Attesting Officer* — *Commissioner of Patents and Trademarks*